United States Patent [19]

Miller et al.

[11] Patent Number: 5,722,638
[45] Date of Patent: Mar. 3, 1998

[54] VALVE WITH MEANS TO BLOCK RELATIVE ROTATION OF PARTS DURING ASSEMBLY

[75] Inventors: Robert F. Miller, Arcadia, Calif.; Frederick J. Haydock, Murray, Utah

[73] Assignee: Vemco Corporation, San Dimas, Calif.

[21] Appl. No.: 628,774

[22] Filed: Apr. 5, 1996

Related U.S. Application Data

[63] Continuation-in-part of Ser. No. 584,225, Jan. 11, 1996, Pat. No. 5,638,862.

[60] Provisional application No. 60/007,380, Nov. 20, 1995.

[51] Int. Cl.⁶ ........................................ F16K 31/50
[52] U.S. Cl. ...................... 251/335.2; 251/266; 251/270
[58] Field of Search .......................... 251/266, 270, 251/335.2

[56] References Cited

U.S. PATENT DOCUMENTS

| | | | |
|---|---|---|---|
| 420,155 | 1/1890 | Hageman . | |
| 669,328 | 3/1901 | Staedeli et al. . | |
| 1,349,145 | 8/1920 | Breinl . | |
| 1,525,113 | 4/1925 | Yarnall . | |
| 1,853,156 | 4/1932 | Sobon . | |
| 1,933,085 | 10/1933 | Barchard | 251/31 |
| 2,047,764 | 7/1936 | Beggs | 251/270 |
| 2,757,898 | 9/1956 | Cox | 251/270 |
| 2,855,940 | 10/1958 | Milleville et al. | 137/1 |
| 3,838,707 | 10/1974 | Wachowitz, Jr. | 137/312 |
| 4,171,792 | 10/1979 | Bass | 251/335.1 |
| 4,231,549 | 11/1980 | Visalli | 251/335.1 |
| 4,461,316 | 7/1984 | Cove et al. | 137/312 |
| 4,499,846 | 2/1985 | Bergeron et al. | 116/272 |
| 4,671,490 | 6/1987 | Kolenc et al. | 251/335.2 |
| 4,687,017 | 8/1987 | Danko et al. | 137/315 |
| 4,732,363 | 3/1988 | Kolenc et al. | 251/335.2 |
| 4,760,990 | 8/1988 | Kerger et al. | 251/335.2 |
| 4,840,195 | 6/1989 | Zabrenski | 137/312 |
| 4,874,007 | 10/1989 | Taylor | 137/312 |
| 4,928,919 | 5/1990 | Daicho et al. | 251/89 |
| 5,048,554 | 9/1991 | Kremer | 137/73 |
| 5,065,788 | 11/1991 | McManigal et al. | 137/505.18 |
| 5,203,370 | 4/1993 | Block et al. | 137/312 |
| 5,295,662 | 3/1994 | Yamaji et al. | 251/335.2 |

FOREIGN PATENT DOCUMENTS

| | | |
|---|---|---|
| 2127641 | 1/1939 | Canada . |
| 2127540 | 1/1995 | Canada . |
| 635310 | 6/1994 | European Pat. Off. . |
| 86439 | 1/1988 | Luxembourg . |
| 86714 | 7/1988 | Luxembourg . |
| 87601 | 2/1990 | Luxembourg . |
| 2274331 | 7/1994 | United Kingdom . |
| 9116216 | 10/1991 | WIPO . |

*Primary Examiner*—A. Michael Chambers
*Attorney, Agent, or Firm*—William W. Haefliger

[57] ABSTRACT

A fluid valve that comprises a body forming a cavity and a cap on the body extending over the cavity, the cap and body carrying interengaging threads allowing rotary make-up of the cap on the body; a diaphragm in the cavity and seated on a ledge formed in the body, thereby to form a seal; a pressure-transmitting element in the cavity to transmit cap thrust to effectuate the seal; and blocking structure to block relative rotary movement between the pressure-transmitting element and the body.

20 Claims, 2 Drawing Sheets

VALVE WITH MEANS TO BLOCK RELATIVE ROTATION OF PARTS DURING ASSEMBLY

This application is a continuation-in-part of prior U.S. application Ser. No. 08/584,225 filed Jan. 11, 1996, now U.S. Pat. No. 5,638,862 issued Jun. 1, 1997, which claims priority from provisional application Ser. No. 60/007,380 filed on or about Nov. 20, 1995, incorporated herein by reference.

This invention relates generally to an assembly of valve parts, and more specifically to valve apparatus, in which seals are made or formed in response to such assembly.

When fluid valve parts are assembled, and a cap is screwed onto a body, a pressure seal or seals are directly made up or formed between the valve parts being assembled. Such seals are desirably made up by axial force only, i.e., free of relative rotation of interengaged surfaces at the seals, since such relative rotation can and does cause surface distortions which can lead to seal failure, fluid leakage, and/or undesirable particle generation. There is need for simple, effective, and reliable means to prevent such sealing surface distortions in devices of this type.

In one example, the problem arises during the assembly of a valve in which a seal is made between a pressure sealing diaphragm, and a valve body. When the cap is tightened, it exerts an axial force on a thrust sleeve, which transmits this force to a diaphragm and forces the diaphragm against the body at the seal. The problem arises because the cap also exerts a rotational force on the thrust sleeve, which transmits this rotational force to the diaphragm. This rotational force may cause the diaphragm to rotate relative to the body. The combination of axial force and rotation of the diaphragm against the body can damage the effectiveness of the seal, can shorten the life of the diaphragm, and may also create unwanted particles. In high-purity valves, minimization of particles is exceedingly important. In all valves, diaphragm life is also very important.

For several reasons, it is extremely important that the unwanted rotations described above be eliminated, and it is the purpose of this invention to accomplish this.

Accordingly, there is need for improvements in the construction and operation of valves, as are provided by the present invention, and which promote safety, reliability, and longevity of such valves.

SUMMARY OF THE INVENTION

It is a major object of the invention to provide improvements meeting the need referred to above. Basically, the invention is embodied in a valve combination that comprises:

a) a body forming a cavity and a cap on the body extending over the cavity, the cap and body carrying interengaging threads allowing rotary make-up of the cap on the body, b) a diaphragm in the cavity and seated on a ledge formed in the body, thereby to form a seal, c) and a pressure-transmitting element in the cavity to transmit cap pressure to effectuate the seal.

Within this environment, the invention comprises a blocking means to block relative rotary movement between the pressure-transmitting element and the body. The blocking means may take the form of a key extending generally radially between the pressure-transmitting element and the body. The key may also be extended to form a blocking means to block relative rotary movement between the pressure-transmitting element and the diaphragm.

Another object of the invention is to provide such a valve which includes a port to pass fluid flow, a seat about the port, and a stopper movable in the cavity toward and away from the seat, to close and open the valve, there being stopper moving structure in the cavity, the diaphragm attached to the structure. As will appear, the pressure-transmitting element may comprise a sleeve extending about the stopper-moving structure.

Also, the body may typically comprise a tubular portion extending about the sleeve, the body tubular portion carrying certain of the threads, and the body tubular portion defining a slot receiving the blocking means.

A further object is to locate the slot to extend in the direction of movement of the stopper.

As will be seen, the sleeve typically extends axially, and the stopper is movable axially, whereby a very simple, effective assembly is provided.

The invention is applicable to cylinder valves, to enable high performance, including high cycling levels (over 25,000 cycles).

These and other objects and advantages of the invention, as well as the details of an illustrative embodiment, will be more fully understood from the following specification and drawings, in which:

DRAWING DESCRIPTION

DETAILED DESCRIPTION

Figure 1:
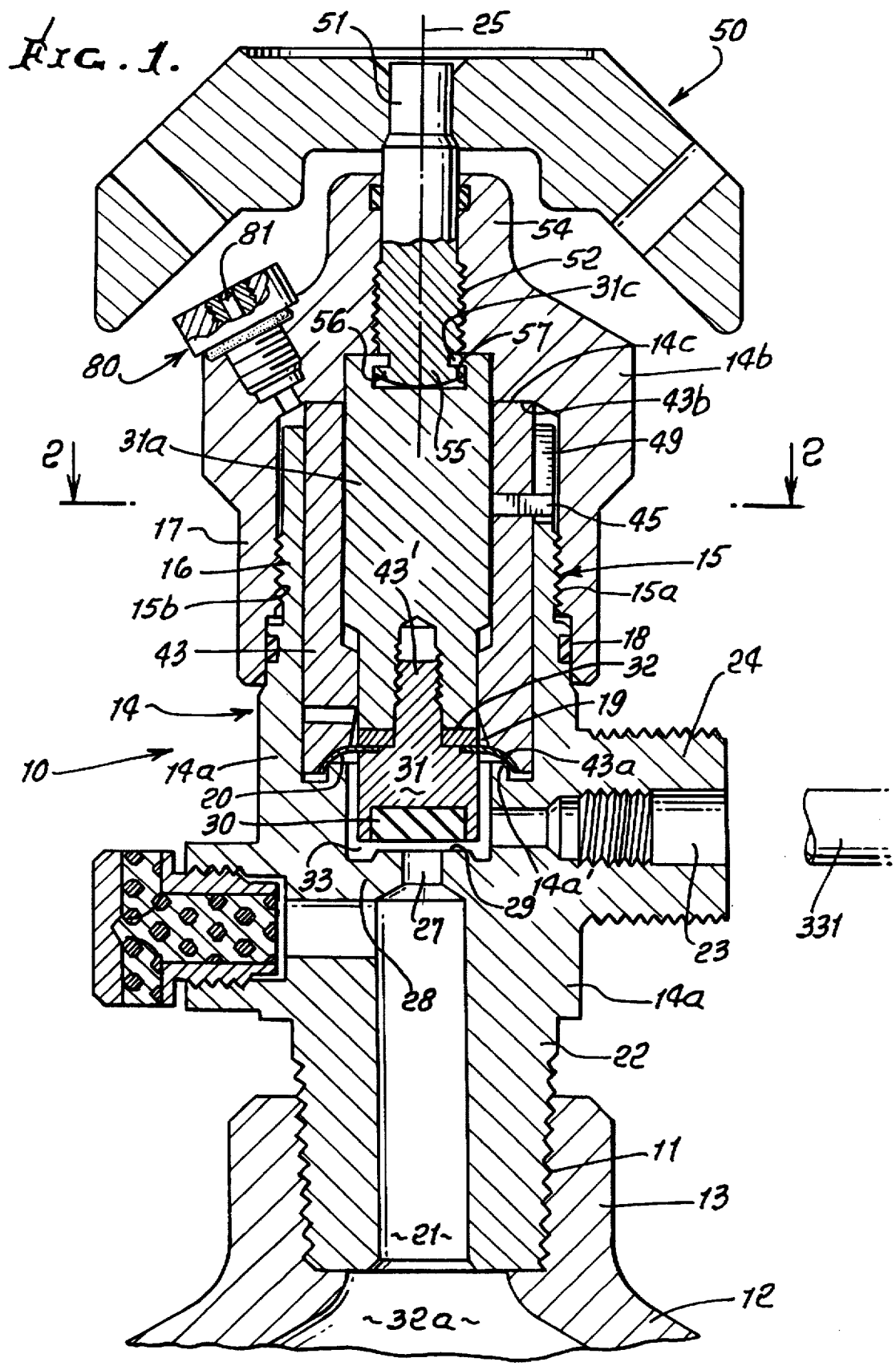
FIG. 1 is a vertical section taken through a valve, incorporating the invention.

The valve unit 10 shown in FIG. 1 is typically connected at 11 to a gas (or other fluid) cylinder 12, as at upper neck 13 of the cylinder. The valve unit includes a housing 14 that in turn may typically include a body 14a and a cap 14b connected to the body at 15. The connection 15 may advantageously include external thread 15a on body upper tubular extent 16, and internal thread 15b on the cap skirt 17 telescopically received over the body upper extent 16. An O-ring seal 18 is provided between body upper tubular extent 16 and cap skirt 17, below the thread connection 15, to block escape of any pressurized fluid that may leak past the thread, from a control chamber 19 above a diaphragm structure 20.

The housing body has a pressurized fluid inlet 21 in body lower tubular extent 22, and a pressurized fluid outlet 23 in a body transverse tubular extent A body longitudinal axis appears at 25. A flow port is provided in the body, as at 27, through body transverse wall 28, and a valve seat is provided at 29 at the upper transversely flat side of wall 28. A seal or stopper 30, carried by a stem 31, is movable upwardly away from the seat and port 27 to open the valve unit, allowing flow from cylinder outlet 32a through 21, 27 and 23, to discharge piping 331; and the seal or stopper is movable downwardly toward the port 27 to close against the seat, blocking fluid flow to 23.

Seal or stopper 30 may consist of non-metallic material, such as an elastomer or plastic substance. Its diameter or width "w" is slightly greater than that of the upwardly protruding seat 29, to ensure tight closure. The stopper and seat may be circular about axis 25, as shown.

Stem structure includes and supports lower stem 31 to extend axially within flow chamber 33 at the lower side of the diaphragm structure 20, and above wall 28, whereby fluid pressure is exerted upwardly on the diaphragm structure when flow port 27 is open, i.e., seal 30 is elevated, as shown in FIG. 1.

Diaphragm 20 lies between body 14a upward annular protrusion 14a' and lower extent 43a of thrust sleeve 43, its purpose being to prevent gas from escaping into the area above the diaphragm when the valve is open.

The wetted area and the dead volume of the valve includes not only the fluid inlet 21, the flow port 27, the fluid outlet 23, but the volume below the diaphragm structure 20, i.e., the volume between the inlet seat 29 and the outlet port 27, namely, the valve internal volume 33. The thrust sleeve 43 allows the internal volume 33 to be minimized in that the diaphragm structure can be lowered from the location of the cap 14b to just above the outlet 23. This minimizes the valve internal volume 33, affording the smallest wetted area and the smallest internal dead volume, both of which are desirable for both baking out the moisture and minimizing other contaminates, and purging the valve. The thrust sleeve thus offers major advantages. Also, the thrust sleeve 43 is also available to clamp the diaphragm structure 20 between itself and the body, with no relative rotation between the sleeve and the body, as is further discussed below.

Figure 2:
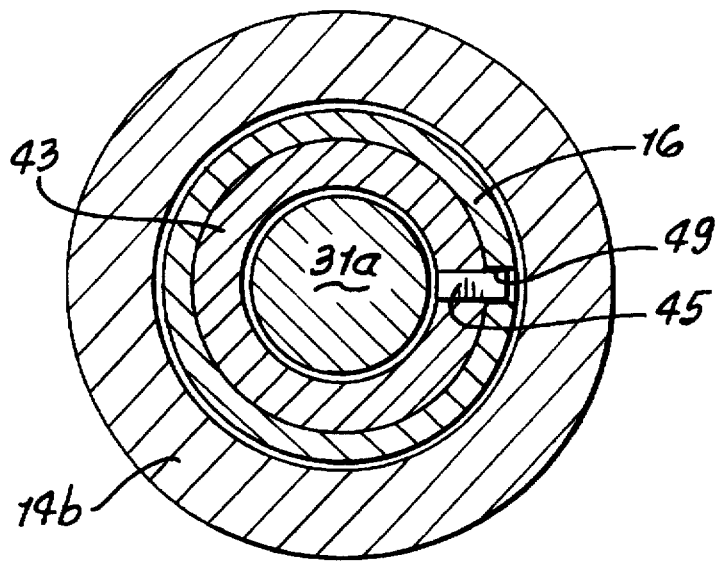
FIG. 2 is a section taken on lines 2—2 of FIG. 1.

In accordance with important aspects of the invention, blocking means is provided to block relative rotary movement between thrust sleeve 43 and body 14a. That blocking means appears as a key 45 that extends generally radially between the pressure-transmitting thrust sleeve 43 and body 14a to block relative rotation therebetween. As cap 14b internal threads 15a engage the external threads 15a of body upper tubular extent 16, full axial force can be exerted in an annular and uniform manner by cap 14b onto pressure-transmitting thrust sleeve 43 to form or produce an annular seal between annular protrusion 14a' and lower surface of diaphragm 20, without causing rotary movement between thrust sleeve 43 and body 14a. The key 45 extends in a slot 49, that extends axially in body upper tubular extent 16, and sidewardly in the latter, the key having substantially the same width as the slot. See FIG. 2. Key 45 engages in slot 49 prior to the time that threads 15b on cap 14b engage the threads 15a on body upper tubular extent 16. Also, the key 45, carried by thrust sleeve 43, travels in the slot 49 as the cap 14b is tightened downwardly.

Figure 3:
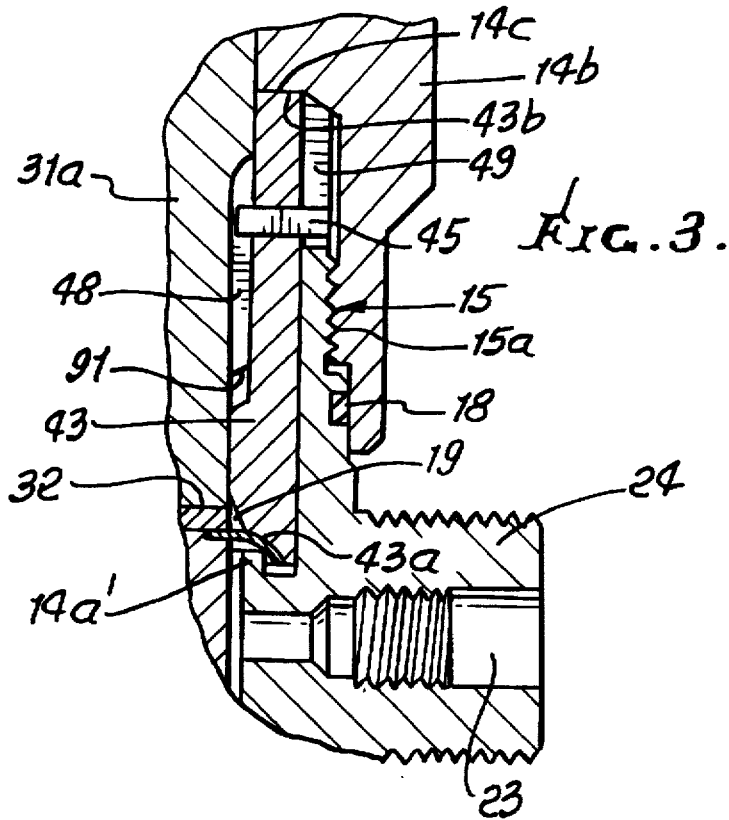
FIG. 3 is a fragmentary vertical section showing a modification.

In the modification shown in FIG. 3, the key also extends radially inwardly, into a slot 48 formed in upper stem 31a. Slot 48 extends lengthwise along the side of upper stem 31a and terminates at location 91 where the outer diameter of upper stem 31a is reduced, enabling axial assembly of upper stem 31a over the key 45. The width of slot 48 is substantially the same as the key width. The key 45 provides a second or axially blocking means to block relative rotary movement between the pressure-transmitting sleeve 43 and the stopper moving stem 31a. Twisting forces applied to diaphragm structure, described below, are thereby eliminated.

As shown in FIG. 1, additional structure include the radially inner extent of the diaphragm structure confined against an upper layer of metallic stem 31. A weld may be provided at that location to prevent leakage.

A central stem or screw 43', integral with stem 31, projects upwardly into upper stem 31a, and may be thread connected to upper stem 31a. The diaphragm structure 20 may comprise a stack of thin metallic diaphragms, which are transversely co-extensive. A cushion structure 32 is shown clamped between the lower end of upper stem 31a and inner extent of the diaphragm.

A control handle 50, located above the cap, is rotatable about axis 25 to move the upper stem 31a axially up and down, to open and close the valve. For this purpose, the handle is integral with an auxiliary upper stem 51, thread connected at 52 to a bore in upper extent 54 of the cap 14b. The lowermost extent of auxiliary upper stem 51 has universal joint connection at 55 to the upper stem 31a , to prevent binding of its axial movement. As shown, the connection 55 includes a flange 56 integral with lowermost extent of auxiliary upper stem 51, received in an internal groove 57 formed in 31a. An annular inner lip 31c on upper stem 31a extends over the flange, to captivate it in groove 57; and the convex lower surface of the flange has centralized bearing surface engagement with the bottom transverse surface of the groove 57. Groove 57 extends axially in one direction to permit assembly. As a result, relatively rotatable, non-binding, thrust-bearing surfaces are provided.

The diaphragm stack 20 has an outer portion that projects annularly outwardly beyond outermost extent of cushion structure 32. The latter may advantageously consist of Neoprene, of hardness between 65 and 75 shore A. The pressurized metal-to-metal seal at clamping zone between 43a, diaphragm 20 and 14a' blocks leakage of high-pressure fluid past the diaphragm. In the unlikely event of such leakage, it will be detected by signaling means generally indicated at 80, which includes a pop-out plunger The cushion referred to herein may consist of resilient elastomer; also, the valve housing may consist of metal.

Figure 4:
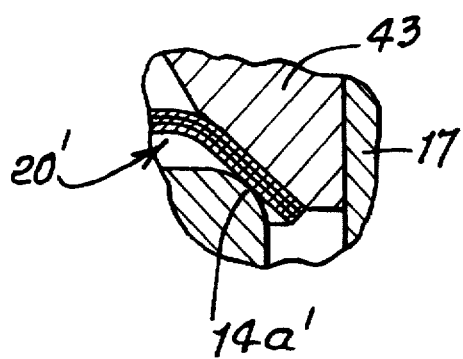
FIG. 4 is a fragmentary section showing sleeve clamping of multiple diaphragms.

FIG. 4 shows use of multiple metallic diaphragms 20'clamped by elongated sleeve

The valve unit to control the flow of high-pressure fluid may be considered to include:

a) a housing having a fluid inlet and a fluid outlet, b) a flow port in the housing communicating between the inlet and outlet, and a seat about the flow port, c) stem structure in the housing, and a stopper carried by the stem structure to be moved therewith toward and away from the seat, d) multiple stacked metallic diaphragms connected to the stem structure and to the housing, to flex and seal off therebetween as the stem structure moves, there being a flow chamber in the housing at one side of the diaphragms, and a control chamber in the housing at the opposite side of the diaphragms, e) control means carried by the housing and extending into the control chamber to effect the movement of the stem structure, the control means being movable relative to the housing, f) deformable cushion structure in the control chamber to cushion movement of the diaphragm in one direction, and to conform to diaphragm flexing, g) the diaphragms having outer portions thereof concave toward the flow chamber, h) the diaphragms having portions clamped by elongated sleeve structure in the housing, the sleeve structure in turn blocked against rotation relative to the housing, whereby the diaphragms are not subjected to sleeve transmitted torque.

We claim:

1. In a fluid valve, the combination comprising:

a) a body forming a cavity and a cap on the body extending over the cavity, the cap and body carrying interengaging threads allowing rotary make-up of the cap on the body, b) a diaphragm in the cavity and seated on a ledge formed in the body, thereby to form a seal, c) and an independent pressure-transmitting element in the cavity to transmit cap thrust to effectuate said seal, said element blocked against rotation.

2. The combination of claim 1 wherein said pressure-transmitting element comprises a sleeve extending about said structure.

3. The combination of claim 2 wherein the valve includes a stopper and a stem carrying the stopper for movement toward and away from a seat extending about a flow port, the diaphragm having an inner portion operatively connected to the stem to move therewith and relative to the ledge, the sleeve being elongated and extending about the stem, the diaphragm inner portion located in proximity to said flow port.

4. The combination of claim 3 wherein the valve body forms a flow exit port closer to said diaphragm than said flow port.

5. In a fluid valve, the combination comprising:
a) a body forming a cavity and a cap on the body extending over the cavity, the cap and body carrying interengaging threads allowing rotary make-up of the cap on the body,
b) a diaphragm in the cavity and seated on a ledge formed in the body, thereby to form a seal,
c) an independent, pressure-transmitting element in the cavity to transmit cap thrust to effectuate said seal, in response to said rotary make up,
d) and blocking means to block relative rotary movement between the pressure-transmitting element and the body.

6. The combination of claim 5 wherein said blocking means is a key extending generally radially between said pressure-transmitting element and said body.

7. The combination of claim 5 including relatively rotatable axial thrust-transmitting shoulders on the cap and the thrust-transmitting element.

8. The combination of claim 5 wherein the valve includes a port in the valve to pass fluid flow, a seat about the port, and a stopper movable in said cavity toward and away from the seat, to close and open the valve, there being stopper moving structure in said cavity, said diaphragm attached to said structure.

9. The combination of claim 8 wherein said pressure-transmitting element comprises a sleeve extending about said structure.

10. The combination of claim 9 wherein said sleeve extends about an axis defined by the body, and said stopper is movable axially.

11. The combination of claim 8 including a control handle operatively connected to said structure, and located externally of said body.

12. The combination of claim 8 including auxiliary blocking means for blocking relative rotary movement between said pressure-transmitting element and said stopper moving structure.

13. The combination of claim 12 wherein said auxiliary blocking means is a key extending generally radially between said pressure-transmitting element and said stopper moving structure.

14. The combination of claim 8 including a pneumatic housing operatively connected to said structure, and located externally of said body.

15. In a fluid valve, the combination comprising:
a) a body forming a cavity and a cap on the body extending over the cavity, the cap and body carrying interengaging threads allowing rotary make-up of the cap on the body,
b) a diaphragm in the cavity and seated on a ledge formed in the body, thereby to form a seal,
c) a pressure-transmitting element in the cavity to transmit cap thrust to effectuate said seal,
d) and blocking means to block relative rotary movement between the pressure-transmitting element and the body,
e) there being a port in the valve to pass fluid flow, a seat about the port, and a stopper movable in said cavity toward and away from the seat, to close and open the valve, there being stopper moving structure in said cavity, said diaphragm attached to said structure,
f) said pressure-transmitting element comprising a sleeve extending about said structure,
g) and wherein said body includes a tubular portion extending about said sleeve, said body tubular portion carrying certain of said threads, and said body tubular portion defining a slot receiving said blocking means.

16. The combination of claim 15 wherein the slot has an axial length to receive the blocking means prior to interengagement of the cap and body threads, which extend about an axis defined by the body.

17. The combination of claim 15 wherein said slot extends in the direction of movement of the stopper.

18. The combination of claim 15 wherein said body defines an axis, and said sleeve and body tubular portion extend axially, and said stopper is movable axially.

19. In a fluid valve, the combination comprising:
a) a body forming a cavity and a cap on the body extending over the cavity, the cap and body carrying interengaging threads allowing rotary make-up of the cap on the body,
b) a diaphragm in the cavity and seated on a ledge formed in the body, thereby to form a seal,
c) a pressure-transmitting element in the cavity to transmit cap thrust to effectuate said seal,
d) and blocking means to block relative rotary movement between the pressure-transmitting element and the body,
e) a port in the valve to pass fluid flow, a seat about the port, and a stopper movable in said cavity toward and away from the seat, to close and open the valve, there being stopper moving structure in said cavity, said diaphragm attached to said structure,
f) there being auxiliary blocking means for blocking relative rotary movement between said pressure-transmitting element and said stopper moving
g) said auxiliary blocking means comprising a key extending generally radially between said pressure-transmitting element and said stopper moving
h) and wherein said stopper moving structure defines a slot which extends axially and receives said key.

20. In a valve unit to control the flow of high-pressure fluid, the combination comprising
a) a housing having a fluid inlet and a fluid outlet,
b) a flow port in the housing communicating between the inlet and outlet, and a seat about said flow port, c) stem structure in the housing, and a stopper carried by the stem structure to be moved therewith toward and away from said seat, d) multiple stacked metallic diaphragms connected to the stem structure and to the housing, to flex and seal off therebetween as the stem structure moves, there being a flow chamber in the housing at one side of the diaphragms, and a control chamber in the housing at the opposite side of the diaphragms, e) control means carried by the housing and extending into the control chamber to effect said movement of the stem structure, the control means being movable relative to the housing, f) and deformable cushion structure in said control chamber to cushion movement of the diaphragms in one direction, and to conform to diaphragm flexing, g) said diaphragms having outer portions thereof concave toward said flow chamber, h) the diaphragms clamped by elongated sleeve structure in the housing, the sleeve structure in turn blocked against rotation relative to the housing, i) said cushion structure being everywhere out of alignment with said sleeve structure in the direction of stem structure movement.

* * * * *